Feb. 17, 1948.   E. SINES   2,436,123
CURB FEELER SWITCH
Filed Dec. 29, 1944
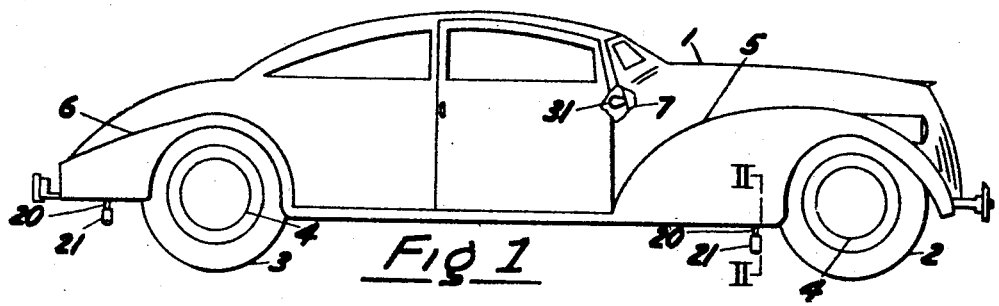
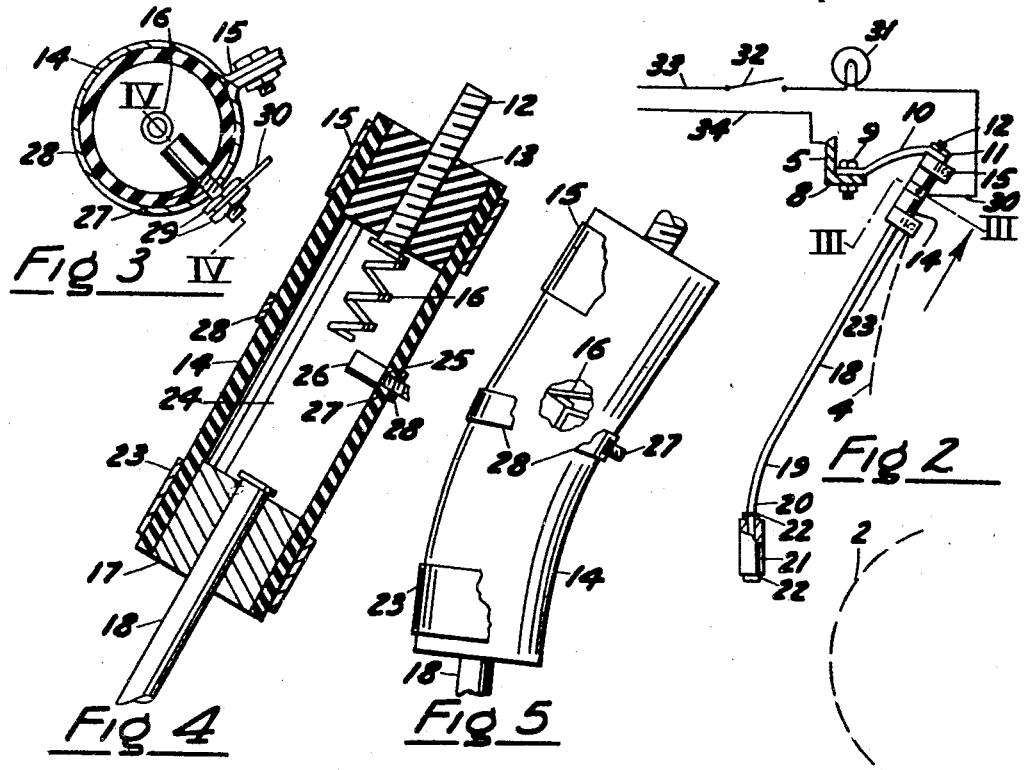
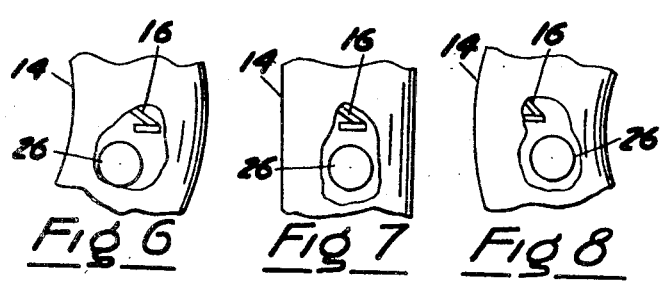
Inventor
Edward Sines
By
Geo E Kirk
Attorney Patented Feb. 17, 1948

2,436,123

UNITED STATES PATENT OFFICE 2,436,123

CURB FEELER SWITCH

Edward Sines, Toledo, Ohio

Application December 29, 1944, Serial No. 570,414

2 Claims. (Cl. 200—52)

This invention relates to proximity disclosing means for a vehicle, and more especially as to contact with a hazard.

This invention has utility when incorporated in signal means as to approach to hindrances not readily observable by the operator of a motor vehicle, and particularly to provide warning against scraping contact of tire sides, wheel hubs, fenders, or bumpers with a curb or adjacent building during parking of an automobile in a prescribed traffic location in regard thereto.

Referring to the drawings:

Fig. 1 is a side view, with a portion broken away, showing an automobile equipped with the devices of the invention;

Fig. 2 is a detail view, on an enlarged scale, of one of the devices installed in Fig. 1, showing the wiring diagram therefor;

Fig. 3 is an enlarged section on the line III—III, Fig. 2, looking in the direction of the arrow, and showing the indicator, signal or control switch for the device;

Fig. 4 is a longitudinal section thru the flexible operating element of the device in the direction extended of the line IV—IV, Fig. 3; the parts being in straight or normal unflexed position;

Fig. 5 is a side elevation of the device of Fig. 4 element, with parts broken away, and distorted into indicating or signal operating position;

Fig. 6 is a fragmentary showing of the flex element of the device, bent transversely to the showing in Fig. 5, showing the switch therein left open;

Fig. 7 is a portion similar to Fig. 6, unflexed, which would be similar to looking into the switch from the left of Fig. 4; and Fig. 8 is a view similar to Fig. 6, with the flexing of the element continued reversely thereto, i. e., in the opposite direction for the showing in Fig. 7 to be the intermediate position.

A motor vehicle 1 is shown with front wheels having pneumatic tires 2, rear wheels having pneumatic tires 3. The said wheels have hub caps 4. In the region of the front wheels are fenders 5, and of the rear wheels, fenders 6. For a closed car just forward of the front seat or operator's station is an instrument panel which may include a glove compartment having a closure or panel section 7.

The fender 5 under portion just after the front wheel, has an inward ledge or flange 8. A bolt 9 therethru provides a ground connection to the car chassis, and simultaneously firmly mounts inward and upwardly directed rigid metal strap or arm 10. The inner upper end of this arm 10 is bent to direct downward. A nut 11 detachably assembles a stem 12 thru the eye end or opening in the upper end of the arm 10. The stem 12 is thru a flexible rubber block or more hard bushing 13. The bushing 13 may even be of metal, or plastic, and snugly enters a sleeve 14, as a rubber or hose flexible section and shield. An adjustable strap clamp 15 provides a firm anchorage for the stem 12, bushing 13 and sleeve 14 to locate flexible conductor or spring extension 16 centrally in the sleeve 14, to complete an electric conductor circuit therefrom thru the stem 12, the arm 10, and the fender 5 to the automobile body 1.

The remote or downwardly and outwardly inclined end of the flexible element or sleeve 14 is closed by a plug or bushing 17 of metal or plastic. The bushing 17 is desirably rigid in itself and has anchored therewith a rod 18, which may be of wire, but is preferably plastic. This plastic staff, or rod of some resilience, has a formed bend portion 19 to an approximately vertical depending section 20 on which is rotatable a sleeve section or roller 21, say also of plastic. While the roller 21, which may be of decorative color, as may also the stem or rod 18, 19, 20, similar or contrasting, may turn easily upon the portion 20, enlargement portions 22, hold the section 21 against shifting lengthwise along the rod portion 20.

An adjustable metal strap or clamp 23, similar to the clamp 15, may detachably assemble this depending arm of the indicator device. The arm portion roller 21 is desirably located some three or four inches from the chassis 1 for this amount of clearance as to the normal line of travel of the tire 2, with possibly a greater clearance latitude for the hub cap 4. It is thus seen that the signal or indicating portion of the device has a normal depending position outward beyond the outer face of the fender 2.

The two clamps 15, 23, seal the flexible section or hose tube 14 to form a closed chamber 24, weather tight. An opening 25 from a central portion of the chamber 24 side wall or tube 14 may have an inner terminal 26 with its stem 27 thrust thru this opening 25. As so protruding thru the opening 25, the stem 27 may assemble the ends of reinforcing strap 28, as a wrapper about the hose 14. Then on the stem 27, nuts 29, not only clamp the strap 28 but assemble an electric conductor or wire 30 as an insulated line back to the panel section 7 there to connect to one terminal of a signal or indicator. The signal is herein shown as a light 31 cut in by ignition switch 32. The electric current supply lines 33, 34, from an energy source on the vehicle, as a storage battery, thereby provide circuit means to be closed or completed as the terminal 26 contacts the adjacent flexible terminal 16. It is to be noted that the mounting for the terminal 26 is flexible, while the terminal 26 itself is rigid. From this it follows that as the hose or sleeve 14 be flexed one way, that is directly forward or directly rearward during car travel by the shoving of the roller 21, the switch 16, 26 remains open (Figs. 6, 7, 8). However, upon the slightest inward urging of the roller 21, whether or not such be a component of forward or rearward transit, or directly inward, the switch 16, 26 (Fig. 5) is at once closed and the light 31 on the dash readily discloses to the vehicle driver that the vehicle proximity to the curb, obstruction or other hazard tends possibly to scrape the tire sides, mar the hub cap, or scratch the finish on the fenders. For plural signals, they are wired in parallel so that any one thereof may operate the signal.

In normal practice, the installation of a single unit of the device may be say near the forward portion of the right side of the vehicle, conveniently to operate as a guide or warning as there is such approach to the curb in parking as to flex the feeler by the roller 21 rubbing upon or rather against the side of the curb as toward the street. The approach or sidewise transit of the vehicle, reduces the outward normal location of the roller 21. This inward flexing component operates the switch in the flexible sleeve or tube 14. An additional device may be located on the same side of the vehicle, say to depend from the rear fender 6. While the two might be separately wired complete as from the fenders 5, 6, to disclose to the driver whether the proximity hazard be front or rear, a wiring in parallel would merely give the general warning.

It is to be noted that the tube 14 allows for universal or general flexing of the feeler, forward, and back, inward and out. When the driving be in a field, where stubble, grass or other general upstanding objects, not necessarily a hazard to limit the lateral bounds in driving, the signal may not be heeded, and may be cut out, as by loosening the light 31. Over rutted highways or thru snow, the normal travel direction forward, or in backing, which may shift the feeler roller 21 parallel to the general line of direction of the chassis 1, does not have any shift component to close the switch 16, 26. These swings frontwise, back and out, mean nothing to the signal, and the mounting flexible section 14 responds with no damage to the general device. The device is, however, sensitive to shiftings of the feeler whether directly inward, or when forward or backward, which include therewith an inward component. At once the feeler roller 21 has its outboard location reduced, from its out-of-bounds safety region for the vehicle, there is signal to the driver of the car. Failure to heed the signal may damage the car, but the overflexing section 16 precludes injury to the device proper.

What is claimed and it is desired to secure by Letters Patent is:

1. A curb-approach indicator device comprising a feeler arm, a flexible cylindrical tubular insulation member having plug closures for the opposite ends of the member, one of said closures mounting the arm, a mounting for the member extending thru the other closure and providing electric conducting means into a chamber of the member formed between the closures, an electric conductor spring helix extending from the conducting means mounting and providing a switch contact, and an additional switch contact in the chamber and mounted therein spaced from the closures and rigidly carried to extend inward from the member wall, which wall is subject to distortion in response to movement of the arm relatively to the member mounting closure to disturb the relation between the switch contacts for making and breaking electric circuit.

2. A signal comprising a rigid contact, and normally spaced therefrom a yieldable contact, a cylindrical tubular hose section forming a chamber housing and providing mounting intermediate the section extent for one of the contacts, a closure for one end of the section providing mounting for the section and the other contact, and a closure for the other end of the section having a feeler arm extending therefrom responsive in imparting flexing of the section in a direction to close the contacts.

EDWARD SINES.

REFERENCES CITED

The following references are of record in the file of this patent:

UNITED STATES PATENTS

| Number | Name | Date |
| --- | --- | --- |
| 2,012,539 | Maas | Aug. 27, 1935 |
| 2,243,497 | Bougee | May 27, 1941 |
| 2,084,939 | Byron | June 22, 1937 |
| 2,302,283 | Yarnall | Nov. 17, 1942 |
| 2,259,614 | Chang | Oct. 21, 1941 |
| 1,709,400 | Hess | Apr. 16, 1929 |
| 2,060,771 | Kempf | Nov. 10, 1936 |
| 2,144,187 | Kotch | Jan. 17, 1939 |
| 2,208,697 | Kernodle et al. | July 23, 1940 |
| 2,270,687 | Morse | Jan. 20, 1942 |

FOREIGN PATENTS

| Number | Country | Date |
| --- | --- | --- |
| 781,942 | France | Mar. 4, 1935 |